United States Patent [19]

Brown et al.

[11] 4,282,584
[45] Aug. 4, 1981

[54] MINI-PROGRAMMABLE CONTROLLER

[75] Inventors: Ronald A. Brown, Willowick; Sung C. Hu, Lyndhurst; Odo J. Struger, Chagrin Falls, all of Ohio

[73] Assignee: Allen-Bradley Company, Milwaukee, Wis.

[21] Appl. No.: 43,897

[22] Filed: May 30, 1979

[51] Int. Cl.³ .................. G05B 19/02; G06F 11/00
[52] U.S. Cl. ........................... 364/900; 364/107; 371/51
[58] Field of Search ........ 364/104, 107, 900 MS File, 364/200 MS File; 371/10, 51

[56] References Cited

U.S. PATENT DOCUMENTS

| | | | |
|---|---|---|---|
| 3,646,522 | 2/1972 | Furman et al. | 364/200 |
| 3,748,649 | 7/1973 | McEowen et al. | 364/200 |
| 3,810,118 | 5/1974 | Kiffmeyer | 364/200 |
| 3,942,158 | 3/1976 | Dummermuth | 364/900 |
| 4,095,094 | 6/1978 | Struger et al. | 364/900 X |
| 4,107,785 | 8/1978 | Seipp | 364/900 |
| 4,165,534 | 8/1979 | Dummermuth et al. | 364/900 |

Primary Examiner—Raulfe B. Zache
Attorney, Agent, or Firm—Quarles & Brady

[57] ABSTRACT

A small, low-cost programmable controller is programmed with both bit-oriented and word oriented program instructions that are stored in a main memory. A microprocessor couples each program instruction to a respective interpreter routine of machine instructions stored in an interpreter memory. Bit-oriented program instructions with a common operation code but different bit-pointer codes are coupled to their own respective interpreter routines. The program instructions have operation codes and bit pointer codes that are assigned by a program panel, and are then translated by a translator PROM as they are coupled to an interpreter routine. Operand addresses are read through the translator PROM unchanged. Error-locating circuitry assists in detecting faulty chips in the main memory as the control program is executed. The hardware required to execute the control program is minimized, while the translator PROM allows the processor unit to be used with prior program panels.

17 Claims, 5 Drawing Figures

MINI-PROGRAMMABLE CONTROLLER

BACKGROUND OF THE INVENTION

1. Field of the Invention

The field of the invention is programmable controllers, including those controllers which are integrated into numerical control systems as programmable interfaces.

2. Description of the Prior Art

In programmable controllers and interfaces a control program is executed by a processor to read input status data from sensing devices on a machine and to generate output status data to output devices controlling the machine. The processor is coupled to a random access read/write memory (RAM) in which the user control program and the input/output status data are stored. The user loads the control program into the RAM through a program loader or program panel, the latter usually having a keyboard and some form of visual display.

The user control program includes instructions that are widely recognized in the industry by their mnemonic labels, such as XIC, XIO and OTE. These instructions perform common control functions that have become well defined as the art has developed. The user control instructions are converted into binary form by the program panel and then loaded into the main memory. The manner in which these binary-coded program instructions are executed depends upon the architecture of the particular controller.

In Kiffmeyer, U.S. Pat. No. 3,810,118, issued May 7, 1974, the control program instructions are stored in a read-only memory (ROM) and are read and executed in sequence. The instructions have a two-bit operation code and a six-bit operand address. The instructions are simply applied to hardware logic circuits to perform control operations on one-bit operands.

In a much larger controller in Dummermuth, U.S. Pat. No. 3,942,158, issued Mar. 2, 1976, the set of control program instructions is greatly expanded, and operands are stored in memory as sixteen-bit words. The much larger programmable controller in the Dummermuth patent executes three types of controller instructions: bit-oriented instructions, control instructions and word-oriented instructions. The bit-oriented instructions include a four-bit operation code, a four-bit bit pointer code and an operand address.

The processor in this controller is comprised of discrete components that decode and execute the various types of program instructions. Bit-pointer codes are decoded by logic circuitry to isolate individual bits in operands for manipulation. Operation codes are also decoded by logic circuitry to perform the directed operations on selected bits.

With the arrival of microprocessor-based controllers, such as that disclosed in Dummermuth et al, U.S. Pat. No. 4,165,534, issued Aug. 21, 1979, it has become possible to eliminate hardwired logic circuits in favor of program instructions to be executed by the microprocessor. This basic software for hardware trade-off has reduced costs in a field where such trade-offs are not automatically economical.

Microprocessors are directed by machine instructions that have been developed by the manufacturer of the particular chip. Controller-type instructions must therefore be converted to machine instructions before being executed by the microprocessor. In the Dummermuth et al U.S. Pat. No. 4,165,534, this is accomplished by designating the controller-type instructions as macro-instructions that are coupled to groups of machine instructions organized in macro-instruction interpreter routines. While some of the controller-type instructions in this prior controller are completely interpreted by machine instructions, a Boolean processor provides hardware assistance in executing bit-oriented instructions.

The Boolean processor decodes both the operation code and the bit pointer code in each bit-oriented program instruction, and performs the directed operation on a selected bit in an operand. To perform the bit-pointer decoding with machine instructions in the controller of the Dummermuth et al U.S. Pat. No. 4,165,534, would have required additional processing time for each bit-oriented program instruction and would have added substantially to the overall processing time for the control program.

It is standard practice in programmable controllers to check data, including program instructions, for parity errors. Memories using currently available circuit chips experience "soft" parity errors due to alpha radiation in the environment. A malfunctioning memory cell can return to normal operation so that the location of the error cannot be found by the time diagnostic routines are applied to the controller processor. These errors are in contrast to "hard" errors, where a memory cell has undoubtedly failed and the affected memory chip must be replaced. The controllers of the prior art do not effectively detect both types of errors, and could be more expensive to maintain and troubleshoot as a result.

The development of prior controllers included the development of a program panel designed especially for operation with the processor of that particular controller. Recent advances in the microcomputer art have provided an opportunity to greatly increase the capabilities of controller processors relative to their cost. There is not, however, a corresponding advantage to be realized from redesigning system program panels. In fact, it would be desirable from a customer viewpoint to be able to use an existing program panel with newly developed central processor units. A technical problem has been the adaptation of a processor in a newly developed programmable interface to an existing program panel for a programmable controller.

More specifically, such a processor must be able to translate from one set of macro-instruction operation codes and bit-pointer codes to another before the macro-instruction operation codes and bit-pointer codes are coupled to an interpreter routine. This problem can be more complex where the operation codes and bit pointer codes in two different controllers have different numbers of bits, and it is desired to use common peripheral equipment, such as a program panel, with both controllers. It would be possible to program a new controller to translate one set of codes received from a program panel to another set of codes which it would then recognize and execute. This would require added memory space and substantial processing time. To provide an economical programmable controller it is necessary to efficiently allocate functions between a processor operable with machine language instructions and other hardware in a central processor unit.

SUMMARY OF THE INVENTION

The invention is incorporated in a digital controller where control program instructions are stored in a main memory and interpreted by machine instructions stored elsewhere in the memory of the controller. Bit-oriented program instructions are interpreted without the hardware assistance of the prior art, and without adding significantly to execution time, by mapping bit pointing program instructions to interpreter routines according to their bit-pointer codes. For a bit-oriented operation, such as the XIC operation, eight interpreter routines XIC0-XIC7 are stored, each corresponding to a bit between 0 and 7, inclusive, to be pointed to and examined. These interpreter routines each require less execution time than would a single routine for pointing to the selected bit and then executing the XIC operation.

As program instructions are coupled to their respective interpreter routines, a translator PROM converts untranslated operation codes and untranslated bit pointer codes recognized by a peripheral device to translated operation codes that are recognized by the controller processor. By inserting a properly programmed translator PROM chip in the controller processor module, operation codes from peripheral devices can be translated to codes that can be interpreted by the processor module. In the specific embodiment disclosed, these translated operation codes are addresses of instructions which point to selected interpreter routines.

By utilizing hardware for the translation of operation codes, and by eliminating hardware in the interpreting of these operation codes, economy is realized without sacrificing a reasonable average processing time for the control program. And while the number of bit-oriented interpreter routines is multiplied by eight for each bit-oriented operation code, these can be stored inexpensively in PROM memory.

In another aspect of the invention, data read from the main memory in the processor module is checked for parity errors, and if such an error is detected, the data and its address location are latched by parity error locator circuitry. The error information can be read by maintenance personnel to locate the exact location of the error and replace the data or the memory chip, as appropriate.

One object of the invention is to provide a small, low-cost programmable controller that can be incorporated in a numerical control system as a programmable interface.

Another object of the invention is to provide a programmable controller that is compatible with prior peripheral equipment.

Another object of the invention is to perform a translation of operation codes that is transparent to the user.

Another object of the invention is to signal the location of errors in data read from the memory, so that chips in the main memory can be tested and replaced.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made to the claims for determining the scope of the invention.

DESCRIPTION OF THE PREFERRED EMBODIMENT

Figure 1:
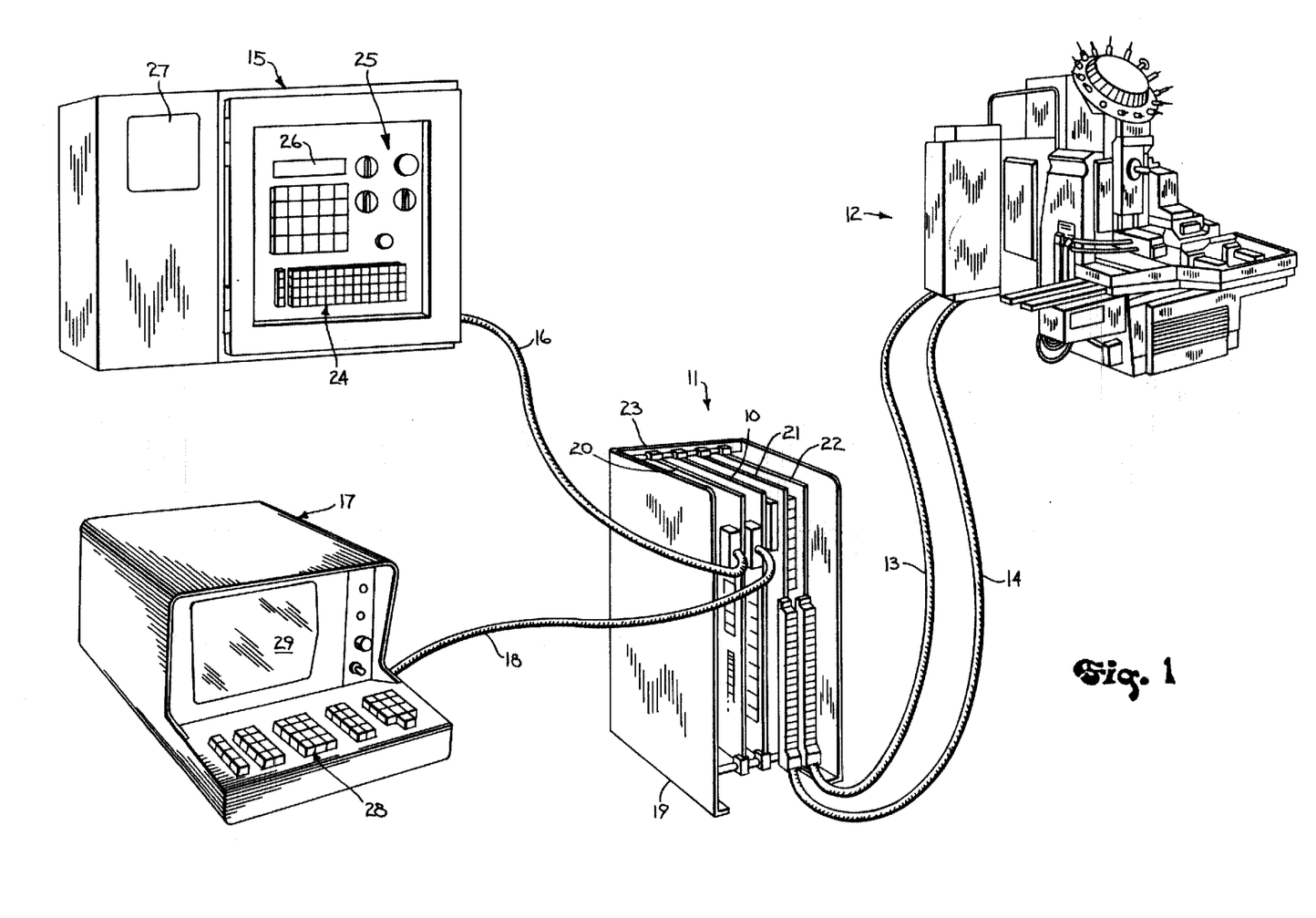
FIG. 1 is a perspective view of a numerical control system in which the present invention is employed.

The invention is embodied in a programmable interface (PI) module 10 in a numerical control system seen in FIG. 1. The numerical control system includes a main control station 11 that is connected to a machine tool 12 through control cables 13 and 14, and a pendant control station 15 that is connected to the main control station 11 through a communication cable 16. A program panel 17 is also connected to the main control station 11 through a communication cable 18.

The main control station 11 is housed in a rack enclosure 19. For a detailed description of this rack enclosure 19, reference is made to Struger et al, U.S. Pat. No. 4,151,580, issued Apr. 24, 1979, and entitled "Circuit Board Assembly with Disconnect Arm." A group of modules, which are printed circuit boards that mount circuit "chips," are supported in closely spaced upright positions in the main control station 11. Besides the PI module 10, these modules include a main processor module 20, a servomechanism interface module 21, and an I/O interface module 22.

These modules 10 and 20-22 are connected to one another through a back plane motherboard 23 mounted on the back of the control station rack 19. The main processor module 20 connects to the communication cable 16 and the programmable interface module 10 connects to the communication cable 18. The servomechanism interface module 21 is connected through one control cable 13 to the servomechanisms which control the motion of a cutting tool on the machine tool 12. And, the I/O interface module 22 is connected through the other control cable 14 to a plurality of I/O devices, such as motor starters, limit switches and solenoids which control the auxiliary functions on the machine tool 12. These auxiliary functions include such operations as tool selection, spindle speed, coolant flow and pallet selection. It is well known by those skilled in the art that other I/O modules 22 are usually included in the rack enclosure 19. While that is true here also, these other I/O modules 22 have not been shown in FIG. 1, since information about them is readily obtained from the numerous references cited herein.

The pendent control station 15 includes a keyboard 24 and switches 25 for manual entry of data. It also includes an optional alphanumeric display 26 and an optional CRT display 27. The pendent control station encloses a processor (not shown in the drawings) which connects to the communication cable 16 and which processes data from the keyboard 24 and switches 25 and outputs data to the alphanumeric display 26 and the CRT display 27.

The program panel 17 includes a keyboard 28 and a visual display 29. Through the program panel 17 a control program of the type executed by programmable controllers is entered into the PI module 10 and is displayed and edited from time to time. The program panel 17 is a peripheral unit, which need not be operatively connected to the main control station while the machine tool 12 is being operated. Therefore, after the entry or editing of the control program, the program panel 17 may be disconnected from the numerical control system and used to program other controllers.

Figure 2:
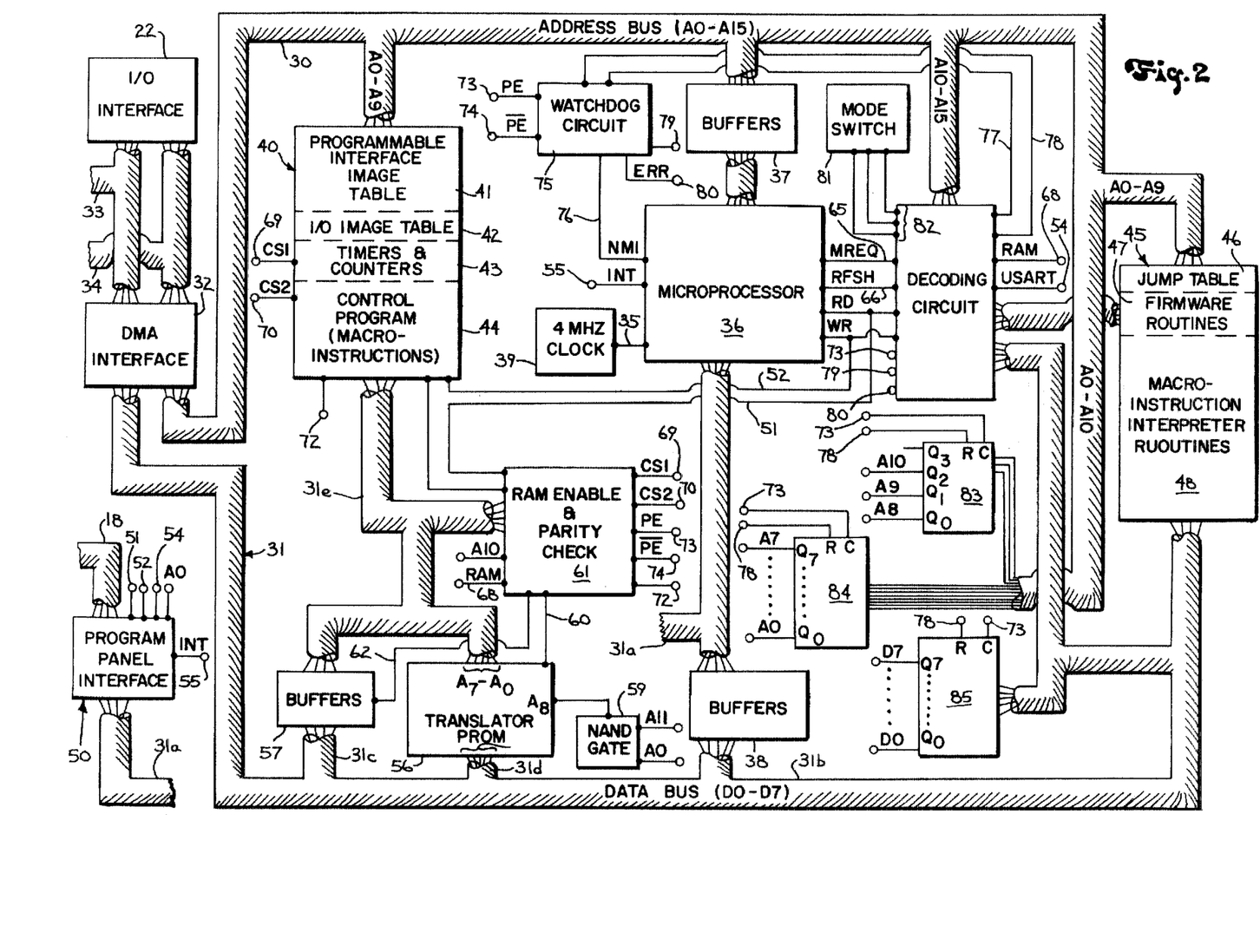
FIG. 2 is a block diagram of a programmable interface which is part of the system of FIG. 1 and which incorporates the present invention.

As seen in FIG. 2, the PI module 10 is connected through a sixteen-bit (A0–A15) PI address bus 30 and an eight-bit (D0–D7) PI data bus 31 to a DMA interface 32. The DMA interface 32 couples these two buses 30 and 31 to a nineteen-bit (AB0–AB14, EXT0–EXT3) main address bus 33 and a sixteen-bit (DB0–DB15) main data bus 34 on the main processor module 20. For a complete description of the construction and operation of the main processor module 20 and the DMA interface 32, reference is made to a copending U.S. patent application, Ser. No. 970,959 entitled "Multiprocessor NC System," and filed on Dec. 19, 1978.

Besides the main processor module 20, the DMA interface 32 also couples the PI module 10 to the I/O module 22, which is connected to the main address and data buses 33 and 34. The I/O module 22 can be either an input module with sixteen input circuits or an output module with sixteen output circuits. Input circuits are connected to sensing devices on the machine tool 12, such as limit switches, and output circuits are connected to operating devices on the machine tool 12, such as motor starters or solenoids. Input circuits which are suitable for this purpose are disclosed in U.S. Pat. Nos. 3,643,115 and 3,992,636, and output circuits which are suitable for this purpose are disclosed in U.S. Pat. No. 3,745,546.

The operation of the PI module 10 is directed by a microprocessor 36 which is coupled to the PI address bus 30 through a set of buffers 37 and which is coupled to the PI data bus 31 through a set of bidirectional buffers 38. The microprocessor 36, which in this embodiment is a Model Z-80A microprocessor manufactured by Zilog, Inc., is driven through a clock line 35 by a fourmegahertz clock circuit 39. Besides the description that follows, reference is also made to the Z80-CPU Technical Manual published in 1976 by Zilog, Inc., for information on the architecture, the operation and the instruction set for this microprocessor 36.

The PI address bus 30 and the PI data bus 31 connect the microprocessor 36 to a main memory and an interpreter memory seen in FIG. 2. The main memory is a 2K-byte random-access memory (RAM) 40 which stores a programmable interface image table 41, an I/O image table 42, a table of preset and accumulated values of timers and counters 43 and a user control program 44. The interpreter memory is a 4K-byte programmable read-only memory (PROM) 45 which stores a table of jump statements 46. It also stores in firmware routines 47, including an I/O scan routine, and a second group of microprocessor instructions organized in macro-instruction interpreter routines 48.

The PI image table 41 in the RAM 40 contains data on the status of the NC portion of the system, while the I/O image table 42 contains data on the status of the sensing devices and the operating devices on the machine tool 12. The control program 44 contains macro-instructions that examine input status data in the image tables 41 and 42 and that control output status data in these tables 41 and 42 according to the logic of such instructions.

The PI image table 41 is updated during a DMA operation in which data is exchanged between the main NC processor module 20 and the PI module 10. As described in the copending application, Ser. No. 970,959 cited above, the DMA interface 32 periodically obtains control of the main address and data buses 33 and 34 in response to a DMA request received from the PI microprocessor 36. During a DMA cycle, the DMA interface 32 divides sixteen-bit words on the main data bus 34 into pairs of eight-bit bytes that are sequentially coupled to the PI data bus 31. The DMA interface 32 also couples pairs of eight-bit bytes sequentially received on the PI data bus 31 to form sixteen-bit data words on the main data bus 34. In this way, data can be coupled between the RAM 40 on the PI module 10 and a memory (not shown) on the main processor module 20.

The I/O image table 42 is updated during an I/O scan operation in which data is received to indicate the status of input circuits in the I/O interface 22. Also during the I/O scan, output status data from the I/O image table 42 is coupled to the I/O interface 22 to set output circuits that control devices on the machine tool 12. The I/O scan is performed at the end of each scan through the control program, or about once every twenty-five milliseconds.

The PI microprocessor 36 signals the DMA interface 32 when an I/O scan cycle is to be performed. After the I/O request signal has been acknowledged, data can be coupled between the I/O image table 42 in the RAM 40 and the I/O interface 22. It will be apparent to those skilled in the art that the PI module 10 could be incorporated in a stand-alone programmable controller. The PI or processor module 10 could then be coupled to the I/O interface 22 through the backplane motherboard 23 without the assistance of the DMA interface 32.

Control program macro-instructions and other data are coupled between the program panel 17 in FIG. 1 and the RAM 40 through a program panel interface 50 seen in FIG. 2. The program panel interface 50 connects one end of the communication cable 18 to a branch 31a of the PI data bus 31 that bypasses the buffers 38 and connects to the microprocessor 36. The program panel interface 50 includes a USART (not shown) which converts between serial data transmitted through the communication cable 18 and parallel data coupled on the PI data bus 31. The microprocessor 36 connects to the interface 50 through a read line 51, a write line 52 and the A0 line in the PI address bus 30. The microprocessor 36 also connects to the interface 50 through a decoding circuit 53 and a USART enable line 54.

The program panel 17 interrupts the microprocessor 36 through an interrupt line 55 connecting the program panel interface 50 to the microprocessor 36. The microprocessor 36 then executes a panel interrupt service routine, which is one of the firmware routines 47 stored in the interpreter PROM 45. During the execution of this routine, the microprocessor 36 transmits logic signals through the read line 51, the write line 52, the USART enable line 54, and the A0 line in the address bus 30 to load, update and read data through front panel interface 50. For further details of the operation of the program panel interface 50, reference is made to the above-cited copending application, Ser. No. 970,959, and the above cited U.S. Pat. No. 4,165,534.

The user enters control program macro-instructions by depressing keys on the program panel 17 in FIG. 1. The binary coded macro-instructions are loaded into the RAM 40 to form the control program 44 in FIG. 2. The control program instruction set is similar to that used in the controller in the U.S. Pat. No. 4,165,534, cited above. This instruction set includes bit-oriented instructions, control instructions and word-oriented instructions. The three groups of instructions are coded as seen in Tables 1, 2 and 3 below. Whereas the eight-bit operation codes in the bit-oriented and word-oriented instructions of the prior controller formed the low bytes of data in the macro-instructions, the operation codes and operand addresses are stored in reverse sequence in the RAM 40, with the operand addresses becoming the low bytes.

The bit-oriented instructions are summarized in Table 1 below.

XIC Examine status bit closed or is the status bit in a logic high state?
XIO Examine status bit open or is the status bit in a logic low state?
OTU If condition is true, turn status bit off (low), and if condition is false do nothing.
OTL If condition is true turn status bit on (high), and if false do nothing.
If condition is true turn status bit on (high), and if conditions are false turn status bit off (low).

The control macro-instructions include those summarized in Table 2 which follows.

TABLE 2

| MNEMONIC | Control Instructions OPERATION CODE | | | | | | | | | | | | | | | |
|---|---|---|---|---|---|---|---|---|---|---|---|---|---|---|---|---|
| NOP | 0 | 0 | 0 | 0 | 0 | 0 | 0 | X | X | X | X | X | X | X | X | X |
| BND | 1 | 1 | 0 | 0 | 0 | 0 | 0 | 0 | X | X | X | X | X | X | X | X |
| BST | 1 | 1 | 0 | 0 | 1 | 0 | 0 | 0 | X | X | X | X | X | X | X | X |
| MCR | 1 | 0 | 1 | 1 | 1 | 0 | 0 | 0 | X | X | X | X | X | X | X | X |
| ZCL | 0 | 0 | 1 | 1 | 0 | 1 | 0 | 0 | X | X | X | X | X | X | X | X |
| END | 0 | 0 | 1 | 0 | 0 | 1 | 0 | 0 | X | X | X | X | X | X | X | X |
| Instruction Bit (Octal) | 17 | 16 | 15 | 14 | 13 | 12 | 11 | 10 | 7 | 6 | 5 | 4 | 3 | 2 | 1 | 0 |

Note: X means "don't care."

It should be noticed that although these control instructions have a sixteen-bit operation code, only bits in the second or high byte determine the control operation. The operations performed by these control instructions are briefly defined as follows:

NOP No operation.

TABLE 1

| | Bit-Oriented Instructions | | | | | | | | | | | | | |
|---|---|---|---|---|---|---|---|---|---|---|---|---|---|---|
| MNEMONIC | OPERATION CODE | | | | BIT POINTER CODE | | | OPERAND ADDRESS | | | | | | |
| XIC | 1 | 1 | 0 | 1 | 0 | b | b | b | r | r | r | s | s | s | I/O | L/H |
| XIO | 1 | 1 | 0 | 1 | 1 | b | b | b | r | r | r | s | s | s | I/O | L/H |
| OTU | 1 | 1 | 1 | 0 | 0 | b | b | b | r | r | r | s | s | s | I/O | L/H |
| OTL | 1 | 1 | 1 | 0 | 1 | b | b | b | r | r | r | s | s | s | I/O | L/H |
| OTE | 1 | 1 | 1 | 1 | 0 | b | b | b | r | r | r | s | s | s | I/O | L/H |
| Instruction Bit (Octal) | 17 | 16 | 15 | 14 | 13 | 12 | 11 | 10 | 7 | 6 | 5 | 4 | 3 | 2 | 1 | 0 |

As seen in Table 1, three bits associated with each operation code form a bit pointer code. Three bits in the operand address specify a rack number and three other bits in the operand address specify a slot number. One bit in the operand address identifies whether the slot address contains an input module or an output module and the last bit specifies whether the I/O address is the low byte or the high byte of a sixteen-bit slot.

The operations performed by the bit-oriented instructions are briefly defined as follows:

BND Branch end: terminates a Boolean subbranch.
BST Branch start: opens a Boolean subbranch.
MCR Master control relay: if decision is false, it forces all following rungs to be false until another MCR instruction produces a true decision.
ZCL Zone control: if decision is false execution is turned off unitl another ZCL instruction is executed.
END Signals end of control program and beginning of I/O scan routine.

The word-oriented macro-instructions include those summarized in Table 3.

TABLE 3

| MNEMONIC | Word-Oriented Instructions OPERATION CODE | | | | | | | | OPERAND ADDRESS | | | | | | | |
|---|---|---|---|---|---|---|---|---|---|---|---|---|---|---|---|---|
| TOF 0.1 | 0 | 0 | 0 | 0 | 1 | 0 | 0 | 0 | c | c | c | s | s | s* | P/A | L/H |
| TON 0.1 | 0 | 0 | 0 | 0 | 1 | 1 | 0 | 0 | c | c | c | s | s | s* | P/A | L/H |
| RTO 0.1 | 0 | 0 | 0 | 1 | 0 | 0 | 0 | 0 | c | c | c | s | s | s* | P/A | L/H |
| TOF 1.0 | 0 | 0 | 0 | 0 | 1 | 0 | 1 | 0 | c | c | c | s | s | s* | P/A | L/H |
| TON 1.0 | 0 | 0 | 0 | 0 | 1 | 1 | 1 | 0 | c | c | c | s | s | s* | P/A | L/H |
| RTO 1.0 | 0 | 0 | 0 | 1 | 0 | 0 | 1 | 0 | c | c | c | s | s | s* | P/A | L/H |
| CTD | 0 | 0 | 0 | 1 | 0 | 1 | 1 | 0 | c | c | c | s | s | s* | P/A | L/H |
| CTU | 0 | 0 | 0 | 1 | 0 | 1 | 0 | 0 | c | c | c | s | s | s* | P/A | L/H |
| RTR | 0 | 0 | 1 | 0 | 0 | 0 | 1 | 0 | c | c | c | s | s | s* | P/A | L/H |
| CTR | 0 | 0 | 1 | 0 | 0 | 0 | 0 | 0 | c | c | c | s | s | s* | P/A | L/H |
| LES | 0 | 0 | 0 | 1 | 1 | 1 | 1 | 0 | r | r | r | s | s | s* | X | L/H |
| EQU | 0 | 0 | 0 | 1 | 1 | 1 | 0 | 0 | r | r | r | s | s | s* | X | L/H |
| PUT | 0 | 0 | 0 | 1 | 1 | 0 | 1 | 0 | r | r | r | s | s | s* | X | L/H |

TABLE 3-continued

| MNEMONIC | Word-Oriented Instructions | | | | | | | | | | | | | | | | |
|---|---|---|---|---|---|---|---|---|---|---|---|---|---|---|---|---|---|
| | OPERATION CODE | | | | | | | | OPERAND ADDRESS | | | | | | | | |
| GET | 0 | 0 | 0 | 1 | 1 | 0 | 0 | 0 | r | r | r | s | s | s* | X | L/H |
| IIN | 0 | 0 | 1 | 1 | 0 | 1 | 1 | 0 | r | r | r | s | s | s* | X | L/H |
| IOT | 0 | 0 | 1 | 1 | 1 | 0 | 0 | 0 | r | r | r | s | s | s* | X | L/H |
| ADD | 0 | 0 | 1 | 0 | 0 | 1 | 1 | 0 | r | r | r | s | s | s* | X | L/H |
| SUB | 0 | 0 | 1 | 0 | 1 | 0 | 0 | 0 | r | r | r | s | s | s* | X | L/H |
| MPY | 0 | 0 | 1 | 0 | 1 | 0 | 1 | 0 | r | r | r | s | s | s* | X | L/H |
| DIV | 0 | 0 | 1 | 0 | 1 | 1 | 0 | 0 | r | r | r | s | s | s* | X | L/H |
| Instruction Bit (Octal) | 17 | 16 | 15 | 14 | 13 | 12 | 11 | 10 | 7 | 6 | 5 | 4 | 3 | 2 | 1 | 0 |

Note:
c c c - timer or counter group,
s s s - slot location,
P/A - preset or accumulator value,
r r r - rack group,
s s s* - slot location in memory outside of physical rack range, and
L/H - low byte or high byte.
X - don't care.

The first group of word-oriented instructions in Table 3 are timer instructions, the second group are counter instructions, the third group are miscellaneous instructions, and the fourth group are arithmetic instructions.

The operations performed by these word-oriented instructions are briefly defined as follows:

TOF If conditions are true turn output on, otherwise, wait until time is out then turn output off.

TON If conditions are true wait until time is out, then turn output on, otherwise, turn output off.

RTO If conditions are true wait until time is out, then turn output on, otherwise, stop timer.

CTD If the conditions are true reduce the count by one.

CTU If the conditions are true increase the count by one.

RTR If the conditions are true reset the timer.

CTR If the conditions are true reset the counter.

EQU Is the value stored in the microprocessor accumulator equal to the value stored on the selected memory line?

LES Is the value stored in the microprocessor accumulator less than the value stored on the selected memory line?

PUT If conditions are true write the number in the microprocessor accumulator in the selected memory line, otherwise, do nothing.

GET Fetch the word on the selected memory line and store in the microprocessor accumulator.

IIN If decision is true, input immediately.

IOT If decision is true, output immediately.

ADD If decision is true, add operands of two previous GET instructions and store result in memory.

SUB If decision is true, subtract operands of two previous GET instructions, and store result in memory.

MPY If decision is true, multiply operands of two previous GET instructions and store in two memory locations (two instructions).

DIV If decision is true, divide operands of two previous GET instructions and store in two memory locations (two instructions).

The microprocessor 36 must first fetch each macroinstruction before it can be executed. A FETCH routine, given in Table 4 below, is executed as a final portion of an interpreter routine for a current macro-instruction to obtain the next macro-instruction in the control program 44. During this routine the operation code and the operand address, if any, are loaded into certain internal registers in the microprocessor 36.

TABLE 4
FETCH Routine

| Instruction Mnemonic | Comment |
|---|---|
| POP HL | Get next instruction; store the operand address in the L register; and store the operation code in the H register. |
| LD E,L | Load operand address (the low byte of the control program instruction) into the E register. |
| LD L,H | Form the address in HL which specifies a |
| LD H,C | location in the jump table 47 in the ROM 23. |
| JP (HL) | Jump indirect via the jump table 47 in the ROM 23 to a selected interpreter routine. |

The microprocessor 36 utilizes several internal registers in executing the fetch routine, these registers including:

PC—a 16-bit program counter
SP—a 16-bit stack pointer
B&C—eight bit registers arranged as a pair
D&E—eight bit registers arranged as a pair
H&L—eight bit registers arranged as a pair The program counter PC stores the memory address of the current microprocessor instruction to be read from the interpreter PROM 45. While this instruction is being read from the interpreter PROM 45, the program counter PC is incremented to address the next line in the interpreter PROM 45. The stack pointer SP stores the memory address of the macro-instruction to be read from the RAM 40. It is initialized to point at the first instruction in the control program 44, and, as each sixteen-bit instruction is fetched, the stack pointer SP is incremented two counts to address the next control program instruction.

The operation code that is fetched by the microprocessor 36 is, in fact, an address in the jump table 46 in the interpreter PROM 45. The jump table 46 given in Appendix A contains statements for jumping to an address of a first instruction in one of the interpreter routines 48 also given in Appendix A. The last portion of each interpreter routine includes the fetch routine as explained above.

Where control program instructions are used to manipulate single bits of data, five bits of the operation code specify the operation such as XIC or XIO, and the other three bits form a bit pointer code. Thus, eight different interpreter routines are required for the XIC group of macro-instructions, i.e., XIC 0, XIC 1, XIC 2, XIC 3, XIC 4, XIC 5, XIC 6 and XIC 7. The interpreter routines match up with the bit selected by the bit pointer code. The interpreter routine for XIC 2 from Appendix A is reproduced in Table 5 below. This interpreter routine examines bit 2 of an input status byte in the I/O image table 42. Bit 2 in this instance represents the status of some relay contacts (not shown).

TABLE 5

XIC 2 Interpreter Routine

| Instruction Mnemonic | Comment |
|---|---|
| LD A,(DE) | Load operand in the A register. |
| BIT 2,A | Test the specified bit. |
| JR NZ,FETCH | Jump to fetch next macro-instruction if bit 2 equals 1 (which represents closed contacts). |
| RES O,B | Reset rung status if bit 2 equals 0 (which represents open contacts). |

FETCH: (see Table 4 above.)

Still referring to FIG. 2, the control instructions in the RAM 40 have operation codes (and bit pointer codes) that cannot be mapped directly to the interpreter routines 48 in the interpreter PROM 45. Instead, the control program instructions 44 in the RAM 40 have operation codes and bit pointer codes that are assigned by the program panel 17, and which shall be referred to as untranslated (UNTRANS.) codes. This allows the program panel 17 to be used with other programmable controllers that recognize the untranslated codes. To relate the untranslated codes to operation codes and bit pointer codes recognized by the microprocessor 36, a translator PROM 56 is connected in the data bus 31.

Besides the bypass branch 31a, the main data bus 31 is divided into a main branch 31b, an input branch 31c, and an output branch 31d, both of which stem from the main branch 31b, and both of which are connected by a two-way branch 31e to the RAM 40. A set of input buffers 47 are connected in the input branch 31c, and the translator PROM 56 is connected in the output branch 31d. The translator PROM 56 is a 512-line-by-8-bit mask-programmable read-only memory with nine address inputs, $A_8$–$A_0$, and eight data outputs 58. Address lines A11 and A0 in the PI address bus 30 are connected through a NAND gate 59 to the most significant address input $A_8$ on the translator PROM 56. The lower eight address inputs $A_7$–$A_0$ of the PROM 56 are coupled to the RAM 40 through branch 31e of the data bus 31, while the eight data outputs 58 are coupled to the main branch 31b of the data bus 31. The translator PROM 56 is enabled through a translator enable line 60 coming from a RAM enable and parity checking circuit 61, so that data can be read from its outputs 58. Another enable line 62 connects this circuit 61 to an enable input on the input buffers 57. The input buffers 57 are enabled through this line 62, so that data can be written into the RAM 40.

In the RAM 40 bit-oriented instructions and word-oriented instructions are each stored on two lines in memory, one line containing an operand address and a succeeding line containing an untranslated operation code, and an untranslated bit pointer code, if applicable. Control instructions have only an untranslated operation code. Where control program instructions have both an operand address and an operation code, the operand address is stored on an even-numbered line while the operation code is stored on an odd-numbered line in the RAM 40.

In the translator PROM 56 the upper 256 lines contain all possible eight-bit operand addresses arranged is sequence so that a one-to-one mapping of data occurs when the upper half of the PROM 56 is addressed. The translated operation codes, which are recognized by this controller, are stored in the lower 256 lines.

In the following Table 6 the untranslated codes for macro-instructions in Tables 1–3 are shown in hexadecimal notation with their translated equivalents, also in hexadecimal notation. Each untranslated code corresponds to the portion of a translator PROM address received at terminals $A_7$–$A_0$, while each translated code is the data stored at that address in the lower half of the translator PROM 56. For bit-oriented instructions the bit pointer code and the operation code are translated together.

TABLE 6

| MNEMONIC | PROGRAM PANEL CODE (UNTRANS.) | PROCESSOR CODE (TRANS.) | MNEMONIC | PROGRAM PANEL CODE (UNTRANS.) | PROCESSOR CODE (TRANS.) |
|---|---|---|---|---|---|
| NOP | 00–07 | 03 | XIO 0 | D8 | 69 |
| TOF 0.1 | 08 | 06 | 1 | D9 | 6C |
| TOF 1.0 | 0A | 09 | 2 | DA | 6F |
| TON 0.1 | 0C | 0C | 3 | DB | 72 |
| TON 1.0 | 0E | 0F | 4 | DC | 75 |
| RTO 0.1 | 10 | 12 | 5 | DD | 78 |
| RTO 1.0 | 12 | 15 | 6 | DE | 7B |
| CTU | 14 | 18 | 7 | DF | 7E |
| CTD | 16 | 1B | OTL 0 | E0 | 81 |
| GET | 18 | 1E | 1 | E1 | 84 |
| PUT | 1A | 21 | 2 | E2 | 87 |
| EQU | 1C | 24 | 3 | E3 | 8A |
| LES | 1E | 27 | 4 | E4 | 8D |
| CTR | 20 | 2A | 5 | E5 | 90 |
| RTR | 22 | 2D | 6 | E6 | 93 |
| END | 24 | 34 | 7 | E7 | 96 |
| ADD | 26 | C9 | OTU 0 | E8 | 99 |
| SUB | 28 | CC | 1 | E9 | 9C |
| MPY | 2A | CF | 2 | EA | 9F |
| DIV | 2C | D2 | 3 | EB | A2 |
| MCR | | 42 | 4 | EC | A5 |
| ZCL | B8–BF | 33 | 5 | ED | A8 |
| BND | C0–C7 | 45 | 6 | EE | AB |
| BST | C8–CF | 48 | 7 | EF | AE |
| XIC 0 | D0 | 4B | OTE 0 | F0 | B1 |
| 1 | D1 | 4E | 1 | F1 | B4 |
| 2 | D2 | 51 | 2 | F2 | B7 |

TABLE 6-continued

| MNEMONIC | PROGRAM PANEL CODE (UNTRANS.) | PROCESSOR CODE (TRANS.) | MNEMONIC | PROGRAM PANEL CODE (UNTRANS.) | PROCESSOR CODE (TRANS.) |
|---|---|---|---|---|---|
| 3 | D3 | 54 | 3 | F3 | BA |
| 4 | D4 | 57 | 4 | F4 | BD |
| 5 | D5 | 5A | 5 | F5 | C0 |
| 6 | D6 | 5D | 6 | F6 | C3 |
| 7 | D7 | 60 | 7 | F7 | C6 |

When a logic low signal is transmitted on the A11 address line, a logic high signal is input to the address terminal $A_8$ on the translator PROM, the upper 256 lines are addressed and a one-to-one mapping of data occurs. This allows untranslated program instructions and other data to be read during the panel interrupt service routine. When the A11 address line carries a logic high signal, the translator PROM 56 is switched to its translating mode of operation in which both translated and untranslated data are read as control program instructions are fetched.

During the FETCH routine an operand address on an even-numbered line of the RAM 40 is loaded first. A logic low signal is generated on the A0 address line to apply a logic high at the $A_8$ address terminal and to provide the one-to-one mapping of data for operand addresses. The address on the PI address bus 30 is then incremented to address an odd-numbered line of the RAM 40 to obtain an operation code. A logic low signal is applied to the $A_8$ address terminal on the translator PROM 56 and a translated operation code is read from one of the lower 256 lines of the PROM 56 onto the PI data bus 31. The translated operation code is then used to couple the microprocessor 36 to one of the interpreter routines 48 as explained above.

The microprocessor 36 is connected to the decoding circuit 53 to address locations in memory and to address other circuitry on the PI module 10. The PI microprocessor is connected to the decoding circuit 53 through the read and write control lines 51 and 52, a memory request (MREQ) line 65 and a refresh (RFSH) line 66. The microprocessor 36 is also connected to the decoding circuit 53 through lines A10–A15 of the address bus 30. Through these lines the microprocessor 36 generates the address signals to be decoded.

For example, the interpreter PROM 45 is connected to the decoding circuit 53 through a four-line PROM enable bus 67. Data is read from the interpreter PROM 45 by generating an address in the PROM 45 on lines A0–A11 of the address bus 30. Lines A0–A9 actually specify the address, while lines A11 and A10 are decoded by the decoding circuit 53 to enable one of four 1 k byte memory chips (not shown) in the POM 45 through a line in the PROM enable bus 67. Similarly, the RAM 40 is addressed and enabled when signals on lines A10–A15 of the address bus 30 are decoded by the decoding circuit 53, and are coupled to the RAM 40 through the RAM enable and parity checking circuit 61. The A10 address line and a RAM enable line 68 coming from the decoding circuit 53 are connected to the RAM enable and parity checking circuit 61. Signals on these lines are further decoded and coupled through two chip select (CS1 and CS2 lines) 69 and 70 to the RAM 40. Through each chip select line 69 and 70, a 1K-by-9-bit block of the RAM is enabled for read and write operations.

The RAM 40 is a 2K-by-9-bit memory that stores data in eight bits of each line and a parity bit in the ninth bit in each line. The stored parity is read out on a parity output line 71 connecting the RAM 40 and the parity checking circuit 61. The RAM enable and parity checking circuit 61 is connected to the data bus 31 to receive data read from the RAM 40, and it calculates the parity of this data and compares it to the stored parity received on the parity output line 71. When data is read into the RAM through the input buffers 57, the parity of the data is calculated, and then transmitted through a parity input line 72 to the proper location in the RAM 40. The RAM enable and parity checking circuit 61 is connected through a parity error (PE) line 73 and a parity error complement ($\overline{PE}$) line 74 to a watchdog circuit 75 to signal a parity error.

The watchdog circuit 75 responds to malfunctions in the operation of the PI module 10 by "timing out" and generating a nonmaskable interrupt (NMI) signal on an NMI line 76 connected to an input on the microprocessor 36. Either the timing out of the watchdog timer circuit 75 or a parity error will generate a nonmaskable interrupt. When the interrupt is generated, the microprocessor 36 executes an error routine. At the end of this routine, the watchdog circuit 75 is reset through a dog reset line 77 and a kickdog line 78 connecting the decoding circuit 53 to the watchdog circuit 75.

During the execution of the error routine the microprocessor 36 reads the status of any errors through a watchdog status line 79 and an error status line 80. These lines connect the watchdog circuit 75 to inputs on the decoding circuit 53. The decoding circuit 53 includes a status port that can be addressed through lines A10–A15 of the PI address bus 30 to read the status of various circuits through lines D0–D7 of the PI data bus 31. Error signals are coupled through the PE line 73, the watchdog status line 78 and the error status line 80 to lines D5–D7, respectively, of the PI data bus 31. A single-pole, three-position mode switch 81 is also connected to the decoding circuit 57 through three inputs 82, so that its status can be read on lines D2–D4 of the PI data bus 31.

The PI module 10 also includes four-bit and eight-bit parity error address latches 83 and 84 and an eight-bit parity error data latch 85. The four-bit address latch 83 has inputs connected to the lines A8–A10 of the PI address bus 30 and the eight-bit address latch 84 has inputs connected to lines A0–A7 of the PI data bus 31. Each of these latches 83–85 has a clock input connected to the PE line 73 coming from the RAM enable and parity checking circuit 61. When a parity error is signalled on the PE line 73, the address on the PI address bus 30 is clocked into the address latches 83 and 84. At the same time the data on the PI data bus 31 is clocked into the data latch 85. The outputs of the latches 83–85 are left unconnected, so that they can be read with test equipment by a maintenance person. The data in the latches 83-85 will provide the exact location in memory where the parity error originated.

The RAM 40 is comprised of four 1,024×4-bit memory chips (not shown) and two 1,024×1-bit memory chips (not shown). Each pair of 4-bit wide chips stores 1 K bytes of data, and is associated with a 1-bit wide chip that stores the parity of the data. By knowning what signal was last present on the A10 address line, it can be determined which of the chip enable lines 69 and 70 was enabled when the parity error occurred. This will isolate a pair of the 1,024×4-bit memory chips as the source of the error. By reading the other ten address bits A0-A9, the line of the RAM in which the parity error occurred can be determined. Because each line in the RAM 40 has four bits stored on one chip, and four other bits stored on another chip, it is necessary to know the precise bit in which the parity error occurred. This is accomplished by reading the data in the data latch 85. The userthen has the option to reprogram and test the RAM chip involved, or replace it.

The latches 83-85 are cleared when the watchdog circuit 75 and the RAM enable and parity checking circuits 61 are reset through the dog reset line 78. The reset signal is generated by the microprocessor 36 through the decoding circuit 53 and the dog reset line 78, which connects to R (reset) inputs on each of the latches 83-85.

In place of the latches 83-85 described herein, the microprocessor 36 could also be programmed to save the address and data on the buses 30 and 31 in specified internal working registers. The location of the error could then be communicated to peripheral devices, such as the program panel 17.

Figure 3:
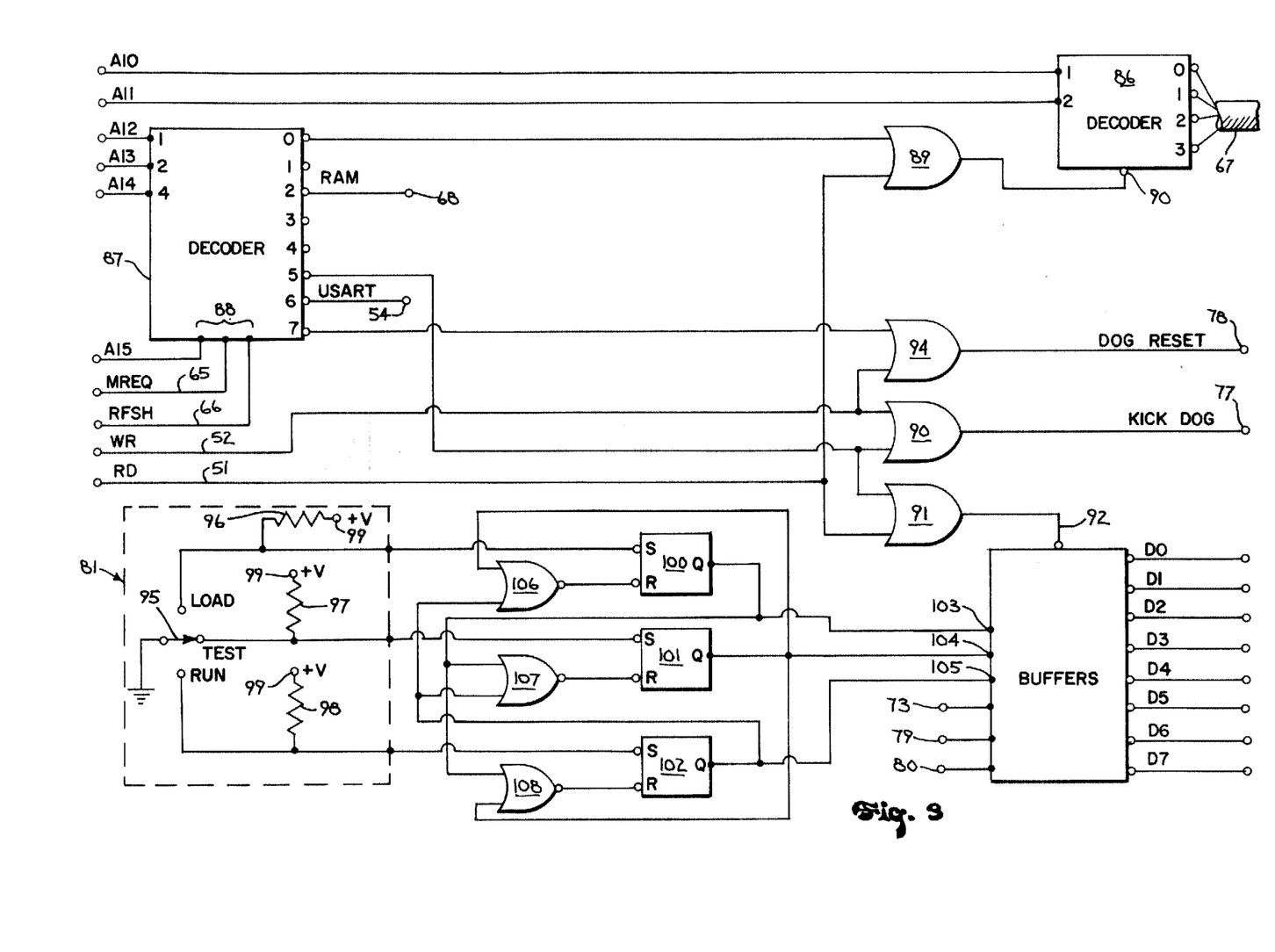
FIG. 3 is an electrical schematic diagram of the decoder circuit in FIG. 2.
Figure 4:
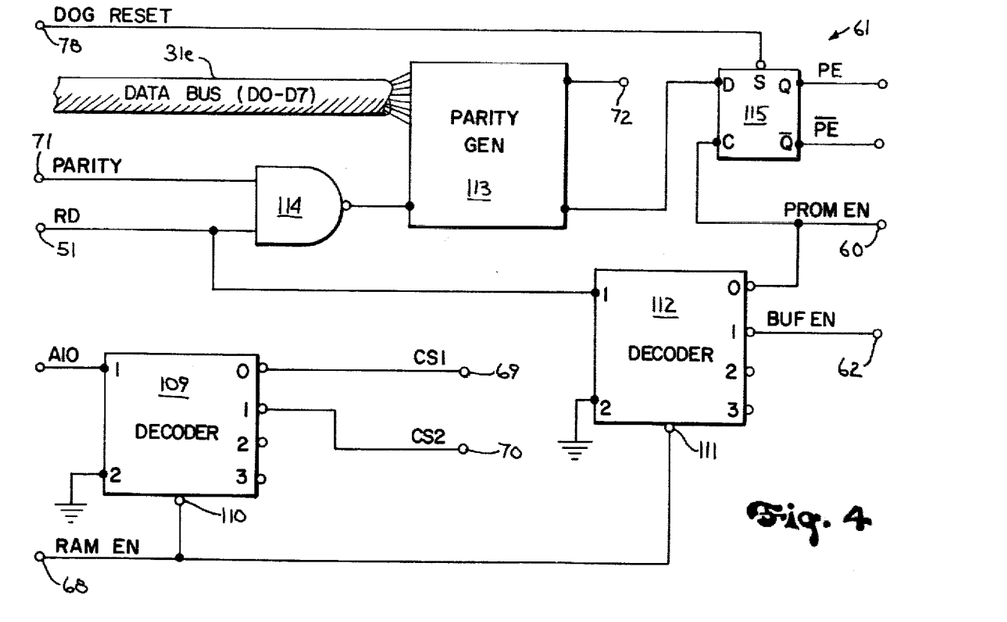
FIG. 4 is an electrical schematic diagram of the RAM enable and parity checking circuit in FIG. 2.
Figure 5:
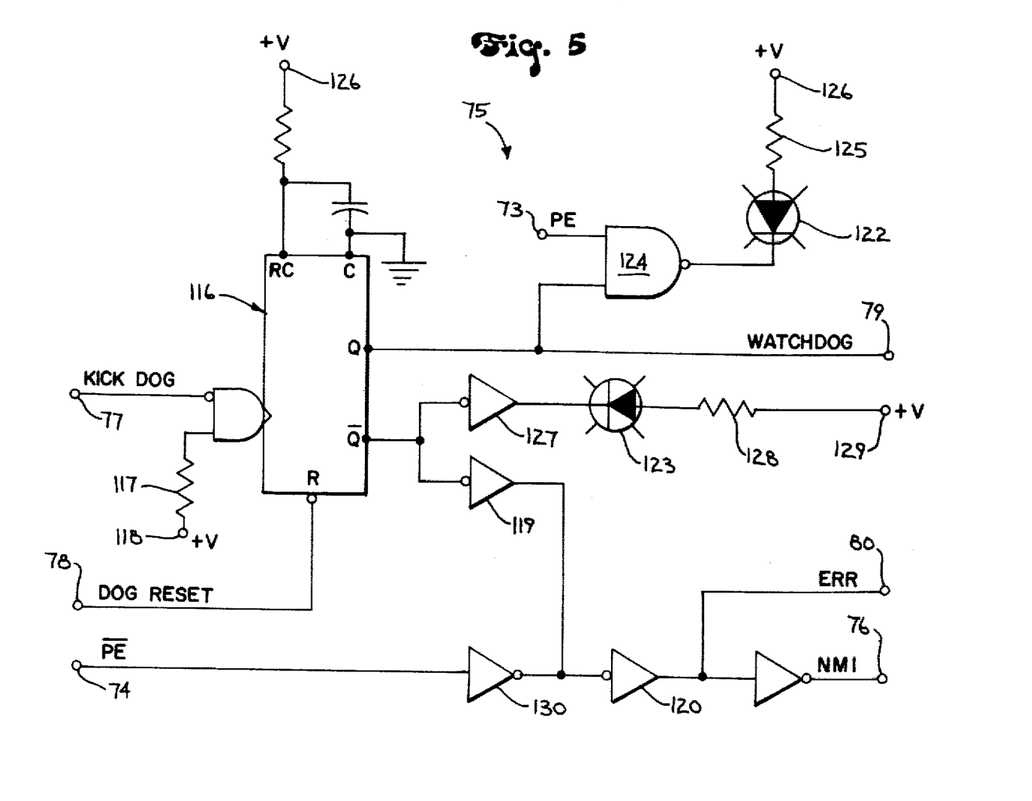
FIG. 5 is an electrical schematic diagram of the watchdog circuit in FIG. 2.

The decoding circuit 53, the RAM enable and parity checking 61, and the watchdog circuit 75, which have been generally described thus far, are shown in more detail in FIGS. 3-5. The components for these circuits are listed with the other components of FIG. 2 in Appendix B. As seen in FIG. 3, the decoding circuit 53 has a 2-line-to-4-line decoder 86 and a 3-line-to-8-line decoder 87 for decoding signals on lines A10-A15 of the PI address bus 30. Lines A10 and A11 connect to a "1" input and a "2" input on the 2-line-to-4-line decoder 86. This decoder 86 has outputs "0-3" that connect to four lines in the ROM enable bus 67. Lines A12-A14 connect to the "1," "2" and "4" inputs on the second decoder 87. The A15 address line, the MREQ line 65, and the RFSH line 66, connect to three enable inputs 88 on the decoder 87.

Outputs "0-7" on the decoder 87 are connected to various enable lines, to enable various hardware circuits on the PI module 10 in response to signals on lines A10-A15. The "0" output is coupled with the read line 51 through an OR gate 89 to an enable input 90 on the 2-line-to-4-line decoder 86. The "2" output is connected to the RAM enable line 68. The "5" output is coupled with the write line through another OR gate 90 to the kickdog line 77, and the "5" output is also coupled with the read line 51 through another OR gate 91 to an enable input 92 on a set of buffers 93. The buffers 93 form a status port where data is coupled from the buffer inputs to lines D0-D7 of the PI data bus 31. The "6" output on the decoder 87 is connected to the USART enable line 54, and the "7" output on the decoder 87 is coupled with the write line 52 through another OR gate 94 to the dog reset line 78. It will be apparent to those skilled in the art that the various circuits on the PI module 10 reside at the following hexadecimal addresses: ROM 45-up to 1,000; RAM 40 (untranslated)-2,000 to 227FF; RAM 40 (translated)-2,800 to 2FFF; status port-5,000 (when read line 51 is active); kickdog line 77-5,000 (when write line 52 is active); program panel interface 50-6,000; and dog reset line 78-7,000.

FIG. 3 also shows more particularly how the mode switch 81 and the error status lines 73, 79 and 80 are coupled through the buffers 93 to lines D2-D7 of the data bus 31. The mode switch 81 has a movable, grounded contact 95 that can be positioned to pull one of three lines, labeled LOAD, TEST and RUN, respectively, to a logic low level. When not pulled low by the grounded contact 95, the lines are pulled high through pull-up resistors 96-98 connecting the lines by a positive d-c voltage source 99. The LOAD, TEST and RUN lines are coupled through S-R type flip-flops 100-102, respectively, to buffer inputs 103-105, respectively. The Q outputs of the flip-flops 100-102 are coupled back through NOR gates 106-108 to an R (reset) input on each other pair of flip-flops 100-102 to assure that only one of the flip-flops 100-102 will be set at a given time. Thus, as seen in FIG. 3, the mode switch is in the TEST mode position to set flip-flop 102 and reset flip-flops 100 and 102.

Referring to FIG. 4, the RAM enable and parity checking circuit 61 more particularly includes a 2-line-to-4-line decoder 109 having a "1" input connected to receive signals on the A10 address line, and having a "2" input that is grounded. The decoder 109 has its "0" and "1" outputs connected to the chip select line 69 and 70. The decoder 109 also has an enable input 110 connected to the RAM enable line 68. When the decoder 109 is enabled through the RAM enable line 68, signals on the A10 address line control the enabling of alternate 1K sections of the RAM 40.

The RAM enable line 68 also connects to an enable input 111 on another 2-line-to-4-line decoder 112. The read line 51 is connected to a "1" input on this decoder 112, and the "2" input is grounded. A logic low signal on the read line 51 enables the translator PROM 56 (seen in FIG. 2) through the translator PROM enable line 60 connected to the "0" output of the decoder 112. A logic high signal on the read line 51 enables the input buffers 57 (also seen in FIG. 2) through the buffer enable line 62 connected to the "1" output of the decoder 111.

The parity checking portion of the circuit 61 includes a parity generator 113 connected to branch 31e of the PI data bus 31. The parity output line 71 and the read line 51 are coupled to an input on the parity generator 113 through a NAND gate 114. When data is read from the RAM 40, a stored parity bit is received by the parity generator 113 and compared with the data received through branch 31e of the PI data bus 31. When data is written into the RAM 40, the parity generator 113 calculates the parity of the data and the calculated parity is written into the RAM 40 through the parity input line 72.

When parity is compared by the parity generator 113, a logic signal is generated on a line connecting the parity generator 113 to a D input on a parity error flip-flop 115. When data read from the RAM 40 has faulty parity, a logic low signal is received at the D input of the flip-flop 115. If a positive-going clock pulse is then received at a clock input on the flip-flop 115 through the translator PROM enable line 60, the flip-flop 115 is reset and a parity error is signaled on the PE line 73 and the $\overline{PE}$ line 74. The dog reset line 78 connects to an S (set) input on this flip-flop 115, so that parity errors can be cleared. It can now be more fully appreciated how an address and data are clocked into the parity error latches 83-85 in FIG. 2 by a signal on the PE line 73. It can also be seen how those latches 83-85 are reset together with the parity error flip-flop 115 through the dog reset line 78.

As seen in FIG. 5, the PE line 73 and the $\overline{PE}$ line 74 are also connected to the watchdog circuit 75. The main component of the watchdog circuit 75 is a multivibrator which is connected to an RC coupling circuit to form a monostable multivibrator 116. The monostable multivibrator 116 remains in an unstable state for a time period of approximately 70 milliseconds before returning to its stable state. The kickdog line 77 is connected to a dual input clock terminal on the multivibrator 116 and the dog reset line 78 is connected to an R (reset) input. The other clock input is pulled high through a resistor 117 by a positive d-c voltage source 118. A Q output on the multivibrator 116 is connected to the watchdog status line 79 and a $\overline{Q}$ output is connected through two inverters 119 and 120 to the ERR status line 80, and through yet an additional inverter 121 to the NMI line 76.

In the watchdog circuit 75, one LED (light emitting diode) 122 is provided to indicate satisfactory operation of the PI module 10 while another LED 123 is provided as a fault indicator. The Q output is connected with the PE line 73 to a NAND gate 124 that has its output connected through the LED 122 and a pull-up resistor 125 to a positive d-c voltage source 126. When logic high signals are present on both the PE line 73 and the watch-dog status line 79, the LED 122 will be illuminated. The Q output is connected through an inverter 127, the other LED 123, and a pull-up resistor 128 to a positive d-c voltage source 129, to provide a visible signal when the watchdog timer 116 has "timed out."

This occurs when the multivibrator 116 is reset, or when a parity error is indicated on the $\overline{PE}$ line 74. The $\overline{PE}$ line 74 is connected through an inverter 130 to perform a "wired OR" function with the line coming from the $\overline{Q}$ output through the inverter 119. When a logic high voltage signal is present at the $\overline{Q}$ output or on the $\overline{PE}$ line 74, a non-maskable interrupt signal will be generated. The second LED 123 will be illuminated and the error can be sensed on the ERR statusline 80.

The watchdog timer 116 is reset through the dog reset line 78, but is not started until a signal is received through the kickdog line 77. If the timer 116 is reset, but not started through the kickdog line 77, and the $\overline{PE}$ line 81 is held low, an interrupt signal cannot be generated on the NMI line 76. Thus, the watchdog circuit 74 can be disabled.

What has been disclosed is a mini-programmable controller that efficiently divides tasks between programmed and unprogrammed circuits to provide greater economy in the manufacture of such controllers. The translator PROM provides a means for converting untranslated codes used in a prior programmable controller to translated codes that are recognized by this controller. A Boolean processor is eliminated by assigning the functions of the Boolean processor to a microprocessor. The architecture of the PI module is such that these additional functions, including the interpretation of bit-oriented macro-instructions, do not cause an undue increase in the average processing time for the control program. Fault detection apparatus is included in the PI module to locate the exact source of parity errors which occur when data is coupled to and from the memory that stores the control program macro-instructions.

Appendix A
INTERPRETER JUMP TABLE AND
BIT-ORIENTED MACRO-INSTRUCTIONS

| Location | Contents | Instruction |
|---|---|---|
| 0000 | C30001 | JP PTO |
| 0003 | C31309 | JP NOPY |
| 0006 | C3FB09 | JP TOF01 |
| 0009 | C3F609 | JP TOF10 |
| 000C | C39B09 | JP TON01 |
| 000F | C39609 | JP TON10 |
| 0012 | C3790A | JP RTO01 |
| 0015 | C3740A | JP RTO10 |
| 0018 | C3C50A | JP CTU |
| 001B | C32B0B | JP CTD |
| 001E | C32208 | JP GET |
| 0021 | C33608 | JP PUT |
| 0024 | C35408 | JP EQL |
| 0027 | C37308 | JP LES |
| 002A | C3A10A | JP CTR |
| 002D | C3A10A | JP CTR |
| 0030 | C30303 | JP FLGOUT |
| 0033 | C3E408 | JP ZCL |
| 0036 | 00 | NOP |
| 0037 | 00 | NOP |
| 0038 | FDCB00FE | SET 7,(IY + 0) |
| 003C | C37A03 | JP INTR |
| 003F | C35009 | JP IDT |
| 0042 | C3CA08 | JP MCR |
| 0045 | C3B408 | JP BND |
| 0048 | C39708 | JP BST |
| 004B | C39204 | JP XIC0 |
| 004E | C39E04 | JP XIC1 |
| 0051 | C3AA04 | JP XIC2 |
| 0054 | C3B604 | JP XIC3 |
| 0057 | C3C204 | JP XIC4 |
| 005A | C3CE04 | JP XIC5 |
| 005D | C3DA04 | JP XIC6 |
| 0060 | C3E604 | JP XIC7 |
| 0063 | C31809 | JP I |
| 0066 | C36701 | JP NMIR |
| 0069 | C3F204 | JP XI00 |
| 006C | C3FE04 | JP XI01 |
| 006F | C30A05 | JP XI02 |
| 0072 | C31605 | JP XI03 |
| 0075 | C32205 | JP XI04 |
| 0078 | C32E05 | JP XI05 |
| 007B | C33A05 | JP XI06 |
| 007E | C34605 | JP XI07 |
| 0081 | C35205 | JP OTL0 |
| 0084 | C36B05 | JP OTL1 |
| 0087 | C38405 | JP OTL2 |
| 008A | C39D05 | JP OTL3 |
| 008D | C3B605 | JP OTL4 |
| 0090 | C3CF05 | JP OTL5 |
| 0093 | C3E805 | JP OTL6 |
| 0096 | C30106 | JP OTL7 |
| 0099 | C31A06 | JP OTU0 |
| 009C | C33306 | JP OTU1 |
| 009F | C34C06 | JP OTU2 |
| 00A2 | C36506 | JP OTU3 |
| 00A5 | C37E06 | JP OTU4 |
| 00A8 | C39706 | JP OTU5 |
| 00AB | C3B006 | JP OTU6 |
| 00AE | C3C906 | JP OTU7 |
| 00B1 | C3E206 | JP OTE0 |
| 00B4 | C30A07 | JP OTE1 |
| 00B7 | C33207 | JP OTE2 |
| 00BA | C35A07 | JP OTE3 |
| 00BD | C38207 | JP OTE4 |
| 00C0 | C3AA07 | JP OTE5 |
| 00C3 | C3D207 | JP OTE6 |
| 00C6 | C3FA07 | JP OTE7 |
| 00C9 | C35E0B | JP ADDD |
| 00CC | C38B0B | JP SUBT |
| 00CF | C3CF0B | JP MTY |
| 00D2 | C3DC0B | JP DIV |
| 00D5 | C3E90B | JP JUMP |
| 00D8 | C3F60B | JP BYTE |
| 00DB | C3FB0B | JP LIMIT |

Appendix A
INTERPRETER JUMP TABLE AND BIT-ORIENTED MACRO-INSTRUCTIONS

| | | |
|---|---|---|
| 00DE | C31309 | JP NOPY |
| 00E1 | C31309 | JP NOPY |
| 00E4 | C31309 | JP NOPY |
| 00E7 | C31309 | JP NOPY |
| 00EA | C31309 | JP NOPY |
| 00ED | C31309 | JP NOPY |
| 00F0 | C31309 | JP NOPY |
| 00F3 | C31309 | JP NOPY |
| 00F6 | C31309 | JP NOPY |
| 00F9 | C31309 | JP NOPY |
| 00FC | C31309 | JP NOPY |
| 00FF | 76 | HALT |

Generalized XIC Macro-Instruction For Bit N

| Instruction | Comment |
|---|---|
| XIC N : LD A,(DE) | Load operand in A. |
| BIT N,A | Test the specified bit. |
| JR NZ,FETCH | Do nothing if closed. |
| RES O,B | Reset rung status if open. |
| FETCH : POP HL | L = operand address; H = op code. |
| LD E,L | Low byte of operand address in E. |
| LD L,H | Form address of |
| LD H,C | jump statement in HL. |
| JP (HL) | Jump via jump table. |

| Location | Instruction | Comment |
|---|---|---|
| 0492 | XIC 0 : LD A,(DE) | Location of first machine instruction in XIC 0 macro-instruction. |
| : | : | |
| 049E | XIC 1 : LD A,(DE) | |
| 04AA | XIC 2 : LD A,(DE) | |
| 04B6 | XIC 3 : LD A,(DE) | |
| 04C2 | XIC 4 : LD A,(DE) | |
| 04CE | XIC 5 : LD A,(DE) | |
| 04DA | XIC 6 : LD A,(DE) | |
| 04E6 | XIC 7 : LD A,(DE) | |

Generalized XIO Macro-Instruction For Bit N

| Instruction | Comment |
|---|---|
| XIO N : LD A,(DE) | |
| BIT N,A | |
| JR Z,FETCH | Do nothing if open. |
| RES O,B | |
| FETCH : POP HL | |
| LD E,L | |
| LD L,H | |
| LD H,C | |
| JP (HL) | |

| Location | Instruction | Comment |
|---|---|---|
| 04F2 | XIO 0 : LD A,(DE) | First machine instruction in XIO 0 macro-instruction. |
| 04FE | XIO 1 : LD A,(DE) | |
| 050A | XIO 2 : LD A,(DE) | |
| 0516 | XIO 3 : LD A,(DE) | |
| 0522 | XIO 4 : LD A,(DE) | |
| 052E | XIO 5 : LD A,(DE) | |
| 053A | XIO 6 : LD A,(DE) | |
| 0546 | XIO 7 : LD A,(DE) | |

Generalized OTL Macro-Instruction For Bit N

| Instruction | Comment |
|---|---|
| OTL N : BIT 4,B | Test master control relay. |
| JR Z:NEWFE | If relay off, start new rung. |
| BIT O,B | Test rung status. |
| JR Z:NEWFE | If rung status is zero, start new rung. |
| LD L,E | Form operand address |
| LD H,D | in HL. |
| SET N,(HL) | Set bit N in HL. |
| NEWFE : DI | Disable interrupts. |
| LD A,FO(H) | Mask off rung status. |
| AND B | Clear rung status. |
| LD B,A | |
| SET O,B | |
| EI | Enable interrupt. |
| FETCH : POP HL | L = operand address; H = op code. |
| LD E,L | Low byte of operand in E. |
| LD L,H | Form address of |
| LD H,C | jump statement in HL. |
| JP (HL) | Jump via jump table. |

| Location | Instruction | Comment |
|---|---|---|
| 0552 | OTL 0 : BIT 4,B | Location of first machine instruction in OTL 0 macro-instruction. |
| : | : | |
| 056B | OTL 1 : BIT 4,B | |
| 0584 | OTL 2 : BIT 4,B | |
| 059D | OTL 3 : BIT 4,B | |
| 05B6 | OTL 4 : BIT 4,B | |
| 05CF | OTL 5 : BIT 4,B | |
| 05E8 | OTL 6 : BIT 4,B | |
| 0601 | OTL 7 : BIT 4,B | |

Generalized OTU Macro-Instruction For Bit N

| Instruction | Comment |
|---|---|
| OTU N : BIT 4,B | |
| JR Z,NEWFE | |
| BIT O,B | |
| JR Z,NEWFE | |
| LD L,E | |
| LD H,D | |
| RES N,(HL) | Reset bit N in HL. |
| NEWFE : DI | |
| LD A,FO(H) | |
| AND B | |
| LD B,A | |
| SET O,B | |
| EI | |
| FETCH : POP HL | |
| LD E,L | |
| LD L,H | |
| LD H,C | |
| JP (HL) | |

| Location | Instruction | Comment |
|---|---|---|
| 061A | OTU 0 : BIT 4,B | Location of first machine instruction in OTU 0 macro-instruction. |
| : | : | |
| 0633 | OTU 1 : BIT 4,B | |
| 064C | OTU 2 : BIT 4,B | |
| 066F | OTU 3 : BIT 4,B | |
| 067E | OTU 4 : BIT 4,B | |
| 0697 | OTU 5 : BIT 4,B | |
| 06B0 | OTU 6 : BIT 4,B | |
| 06C9 | OTU 7 : BIT 4,B | |

Generalized OTE Macro-Instruction

Appendix A
INTERPRETER JUMP TABLE AND BIT-ORIENTED MACRO-INSTRUCTIONS
For Bit N

| Instruction | Comment |
|---|---|
| OTE N : LD L,E | Form operand address |
|     LD H,D | in HL. |
|     BIT 4,B | |
|     JR Z,RES | |
|     BIT O,B | |
|     JR Z,RES | |
|     SET N,(HL) | Set bit N in HL. |
| NEWFE : DI | |
|     LD A,FO(H) | |
|     AND B | |
|     LD B,A | |
|     SET O,B | |
|     EI | |
| FETCH : POP HL | |
|     LD E,L | |
|     LD L,H | |
|     LD H,C | |
|     JP (HL) | |
| RES : RES N,(HL) | Reset bit N in HL. |
| NEWFE : DI | |
|     LD A,FO(H) | |
|     AND B | |
|     LD B,A | |

Appendix A
INTERPRETER JUMP TABLE AND BIT-ORIENTED MACRO-INSTRUCTIONS

```
            SET O,B
            EI
   FETCH :  POP HL
            LD E,L
            LD L,H
            LD H,C
            JP (HL)
```

| Location | Instruction | Comment |
|---|---|---|
| 06E2 | OTE 0 : LD L,E | Location of first machine instruction in OTE 0 macro-instruction. |
| 070A | OTE 1 : LD L,E | |
| 0732 | OTE 2 : LD L,E | |
| 075A | OTE 3 : LD L,E | |
| 0782 | OTE 4 : LD L,E | |
| 07AA | OTE 5 : LD L,E | |
| 07D2 | OTE 6 : LD L,E | |
| 07FA | OTE 7 : LD L,E | |

Appendix B
COMPONENT APPENDIX

| Component | Reference Number | Description |
|---|---|---|
| Microprocessor | 36 | Z-80A CPU manufactured by Zilog |
| RAM | 40 | Four 2114 1024 X 4-bit random-access memories manufactured by Intel Corporation and two 2102 1024 X 1-bit random-access memories manufactured by Intel Corporation |
| Interpreter PROM | 45 | Four 82S181 1K X 8-bit programmable read-only memories manufactured by Signetics |
| Translator PROM | 69 | SN74S472 512-line X 8-bit programmable read-only memory manufactured by Texas Instruments, Inc. |
| 3-line-to-8-line decoder | 87 | SN74LS138 3-to-8-line decoder manufactured by Texas Instruments, Inc. |
| 2-line-to-4-line decoders | 86, 109, 112 | Two SN74LS139 dual 2-to-4-line decoder manufactured by Texas Instruments, Inc. |
| Parity generator | 113 | SN74LS280 nine-bit odd/even parity generator manufactured by Texas Instruments, Inc. |
| Buffers | 37 | Two SN74LS244 octal buffers and line drivers manufactured by Texas Instruments, Inc. |
| Bidirectional buffers | 38 | 8304 Octal bidirectional buffers/line drivers manufactured by National Semiconductor, Inc. |
| Flip-flops | 100–102 | SN74LS279 quad S-R latches manufactured by Texas Instruments, Inc. |
| NOR gates | 106108 | SN24LS02 quad 2-input positive NOR gates manufactured by Texas Instruments, Inc. |
| OR gates | 89–91, 94 | Two SN74LS32 quad 2-input positive OR gates manufactured by Texas Instruments, Inc. |
| Flip-flop | 115 | SN7474 dual D-type positive-edge-triggered flip-flops manufactured by Texas Instruments, Inc. |
| NAND gate | 114 | SN74LS00 quad 2-input positive NAND gates manufactured by Texas Instruments, Inc. |
| NAND gate | 124 | SN7401 quad 2-input open-collector NAND gates manufactured by Texas Instruments, Inc. |
| Multivibrator | 116 | SN74LS123 dual retriggerable monostable multivibrators manufactured by Texas Instruments, Inc. |
| Inverters | 119, 121, 127 and 130 | SN7406 hex inverters with open collectors manufactured by Texas Instruments, Inc. |
| Inverters | 120 | SN74LS14 hex Schitt-trigger inverters manufactured by Texas Instruments, Inc. |
| 4-bit latch | 83 | SN74LS175 quad D-type flip-flops manufactured by Texas Instruments, Inc. |
| 8-bit latch | 84, 85 | Two SN74LS273 octal D-type flip-flops |

| | Appendix B | |
|---|---|---|
| | COMPONENT APPENDIX | |
| Component | Reference Number | Description |
| | manufactured by Texas Instruments, Inc. | |

We claim:

1. An improved digital controller of the type having an I/O interface for connection to a plurality of control devices, a first memory means that stores operands of status data, and means electrically connected between the first memory means and the I/O interface for coupling the status data therebetween to monitor and control the I/O devices, wherein the improvement comprises:

second memory means for storing a group of bit-oriented program instructions, each instruction from the group including a group operation code, a selected bit pointer code, and the address of a selected operand;

third memory means for storing machine instructions organized in a set of interpreter routines associated with the group of bit-oriented program instructions, each interpreter routine for performing an operation directed by the group operation code on a bit of operand data specified by the selected bit pointer code, the third memory means also storing machine instructions to couple each bit-oriented program instruction to its respective interpreter routine; and processor means coupled to the first, second and third memory means, and responsive to the machine coupling instructions in the third memory means, to read a bit-oriented program instruction from the second memory means and to execute a respective interpreter routine in the third memory means according to the bit pointer code of the program instruction, to read the selected operand from the first memory means and to manipulate a bit of data in the selected operand.

2. The improved controller of claim 1, wherein the first memory means comprises:

main memory means for storing operands of status data and bit-oriented program instructions that include untranslated operation codes and untranslated bit pointer codes; and translating memory means having a first portion for storing translated operation codes and translated bit pointer codes, and having a second portion for storing words of mapping data that are each identical to at least a portion of its address; and wherein the processor means is operable to couple the untranslated operation code and the untranslated bit pointer code in each bit-oriented program instruction to the first portion of the translating memory means to read translated codes therefrom, and is operable to couple the operand address in each bit-oriented program instruction to the second portion of the translating memory means to read the operand address therefrom.

3. The improved controller of claim 1, wherein:

the second memory means also stores a set of machine pointer instructions, each pointing to the starting address of a respective interpreter routine;

wherein the operation code and bit pointer code read as part of each bit-oriented program instruction from the first memory means define the address of a respective pointer instruction; and wherein the processor means is responsive to each bit-oriented program instruction to fetch and execute the addressed pointer instruction, and is thereafter responsive to execute the interpreter routine associated with the pointer instruction.

4. The improved controller of claim 1, wherein the improvement further comprises:

error checking means coupled to the first memory means for detecting errors in data as program instructions and operand data are read from the first memory means; and storage means, responsive to the detection of an error by the error checking means, for receiving and storing both the data in which the error is detected and the memory address of such erroneous data.

5. An improved digital controller of the type having an I/O interface responsive to status data for controlling devices on a machine, and having means for coupling status data between a main memory and the I/O interface, wherein the improvement comprises:

a main memory that stores controller-type instructions and status data, each controller-type instruction including an untranslated operation code and the address of a status data operand;

interpreter memory means for storing machine instructions organized in interpreter routines, each interpreter routine being associated with a translated operation code;

translating memory means for storing translated operation codes at a first set of addresses and for storing mapping data at a second set of addresses, each word of mapping data being identical to a portion of its respective address in the second set of addresses, the translating memory means having a plurality of address inputs coupled to the main memory to receive data therefrom, and having a control input for receiving a control signal;

processor means coupled to both the main memory and the control input on the translating memory means, for generating an untranslated operation code and a control signal at the inputs of the translating memory means to read a translated operation code therefrom, the processor means also being coupled to the interpreter memory means and being responsive to the translated operation code to execute an associated interpreter routine.

6. The improved controller of claim 5, wherein the processor means is also operable for generating an operand address and a second control signal at the inputs on the translating memory means to read data which is identical to the operand address stored in the main memory.

7. The improved controller of claim 6, wherein:

the main memory also stores other data besides operation codes and operand addresses; and wherein the processor means is also operable for generating this other data and the second control signal at the inputs on the translating memory means to read this other data from the translating memory means.

8. An improved digital controller of the type having an I/O interface responsive to status data for controlling devices on a machine, and having means for coupling status data between a main memory and the I/O interface, wherein the improvement comprises:
- first means for entering controller-type instructions and status data into the controller, each controller-type instruction including an untranslated operation code and the address of a status data operand;
- second means coupled to the first means for storing translated operation codes at a first set of addresses and for storing mapping data at a second set of addresses, each word of mapping data being identical to a portion of its respective address in the second set of addresses, the second means having a plurality of address inputs receiving an untranslated operation code, and having a control input for receiving a control signal;
- third means for storing machine instructions organized in interpreter routines, each interpreter routine being associated with a translated operation code;
- fourth means coupled to both the first means and the control input on the second means, for generating an untranslated operation code and a control signal at the inputs of the second means to read a translated operation code therefrom; and
- fifth means coupled to the second means and the third means and responsive to the translated operation code read from the second means to execute an associated interpreter routine in the third means.

9. The improved controller of claim 8, wherein the fourth means is also operable for generating an operand address and a second control signal at the address inputs on the second means to read data which is identical to the operand address entered through the first means.

10. The improved controller of claim 9, wherein:
- the first means is operable for entering other data besides operation codes and operand addresses; and
- wherein the fourth means is also operable for generating this other data and the second control signal at the address inputs on the second means to read this other data from the second means.

11. A digital controller which comprises:
an address bus;
a data bus;
I/O interface means for coupling input status data and output status data between the data bus and devices on a controlled machine;
interpreter memory means for storing machine instructions organized in interpreter routines that perform controller-type operations;
main memory means, coupled to the address bus, for storing control program instructions that include untranslated operation codes and operand addresses, and for storing operand status data;
a translator memory, coupled to the data bus and coupled to the main memory means to be addressed by data read from the main memory means, the translator memory storing translated operation codes at a first set of addresses and storing mapping data at a second set of addresses; and
processor means coupled to the address bus, coupled to the data bus, and coupled to the interpreter memory means, for coupling translated operation codes and associated operand addresses from the main memory means together with control signals to the translator memory,
wherein the processor means is responsive to machine instructions stored in the interpreter memory means to read a translated operation code and a mapped operand address from the translator memory, and is further responsive to execute an interpreter routine to perform the operation directed by the translated operation code on a selected operand.

12. The digital controller of claim 11, wherein the translator memory is a PROM.

13. The digital controller of claim 12, wherein:
the main memory means also stores operands; and
wherein the processor means is responsive to another machine instruction to read the operand into the second set of addresses in the translator memory, and to read the operand from the translator memory.

14. The digital controller of claim 11, wherein the processor means includes a microprocessor.

15. The digital controller of claim 11, wherein the translator memory has a most significant address input coupled to the processor means through a least significant address line in the address bus to receive control signals, and has other address inputs coupled to the main memory means to receive data.

16. A digital controller which comprises:
I/O interface means for operating a plurality of control devices on a machine;
memory means for storing data representing the status of the controlled devices and for storing a control program of controller-type instructions;
processor means for generating addresses to read control program instructions, for executing the control program instructions to manipulate the status data, and for coupling status data between the memory means and the I/O interface means;
error checking means coupled to the memory means for detecting an error in data coupled from the memory means during the execution of the control program;
error status means coupled to the error checking means for signaling that an error has been detected; and
error storage means, coupled to the memory means, coupled to the processor means, coupled to the error status means and responsive to an error signal from the error status means, for receiving and storing both the erroneous data from the memory means and the address generated by the processor means to read such erroneous data.

17. The controller of claim 16, wherein the memory means comprises:
main memory means, including a plurality of circuit chips, for storing operands of status data and controller-type instructions that include untranslated operation codes; and
translating memory means having a first portion for storing translated operation codes, and having a second portion for storing words of mapping data that are each identical to at least a portion of its address; and
interpreter memory means for storing machine instructions organized in interpreter routines, each interpreter routine being associated with a translated operation code; and wherein the processor is operable for coupling each controller-type instruction through the translating memory means to a respective interpreter routine; and wherein the error storage means receives and stores a location of one of the circuit chips in the main memory means when an error occurs during execution of the control program.

* * * * *